W. GROUT.
Lathe-Dogs.

No. 154,671. Patented Sept. 1, 1874.

WITNESSES:
Chas. Nida
Alex. F. Roberts

INVENTOR:
W. Grout
BY Munn & Co
ATTORNEYS.

UNITED STATES PATENT OFFICE.

WILLIAM GROUT, OF NEW YORK, N. Y., ASSIGNOR TO LEVI A. FULLER.

IMPROVEMENT IN LATHE-DOGS.

Specification forming part of Letters Patent No. 154,671, dated September 1, 1874; application filed August 10, 1874.

*To all whom it may concern:*

Be it known that I, WILLIAM GROUT, of the city, county, and State of New York, have invented a new and useful Improvement in Universal Carrier for Lathes, of which the following is a specification:

The object of this invention is to provide a carrier to take the place of the numerous iron dogs which are used on the face-plate of iron lathes, for holding and carrying the various articles which are turned, bored, or operated upon.

Figure 1:
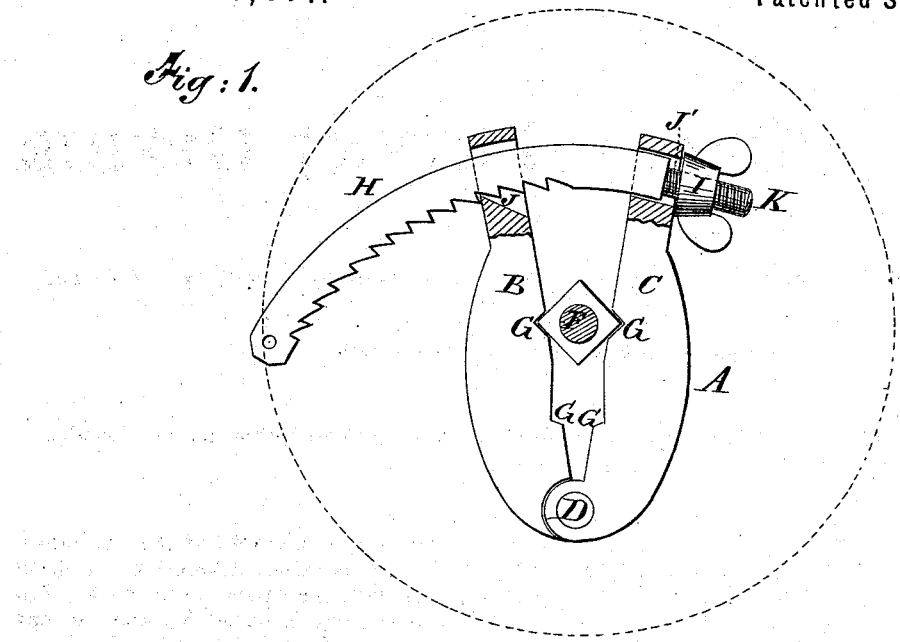
Figure 2:
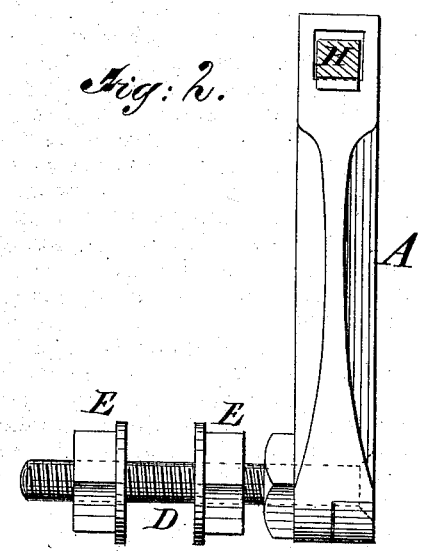

In the drawing, Figure 1 is a sectional front view of the carrier attached to the face-plate of a lathe, and Fig. 2 is a side view of the carrier detached.

Similar letters of reference indicate corresponding parts.

A is a clamp composed of two jaws, B and C, connected together by the pivot-bolt D. This bolt D passes through the face-plate of the lathe, and the carrier is fastened to the face-plate by means of the screw-nuts E E, so that it will stand out an inch (more or less) from the surface of the face-plate. F is the lathe center. Notches of any desired size and shape are cut on the inner sides of these jaws, as seen at G, to more effectually hold a square or round piece of iron. The clamp is made to hold and carry such square, round, or other shaped piece of iron or metal, by means of the curved ratchet-bar H and thumb-nut I. J J' are mortises through the ends of the jaws in which the ratchet-bar works. On one end of the bar is a screw, K, and the nut I bears against the jaw C, as seen in the drawing. The end of the mortise J (in the jaw B) is beveled to receive the teeth of the ratchet, as represented in Fig. 1. By means of this ratchet and screw, it will be seen that the jaws can be adjusted so as to hold any article from the size of a quarter of an inch up.

This carrier is designed to take the place of the numerous dogs and carriers now used on lathes in turning and working iron, cutting screw-threads on bolts and in nuts, and for all similar operations.

The face-plate of the lathe is represented in dotted lines in the drawing.

Having thus described my invention, I claim as new, and desire to secure by Letters Patent—

The combination of clamp-jaws B C, pivot and connecting-bolt D, ratchet-bar H and thumb-nut I, as shown and described, to form a carrier adapted for application to the face-plate of a lathe, as set forth.

WILLIAM GROUT.

Witnesses:
   T. B. MOSHER,
   ALEX. F. ROBERTS.